(12) United States Patent
Chen et al.

(10) Patent No.: US 10,963,550 B2
(45) Date of Patent: Mar. 30, 2021

(54) METHOD AND APPARATUS FOR PERSON IDENTIFICATION BY A SMART DEVICE

(71) Applicant: Goertek Inc., Weifang (CN)

(72) Inventors: Chuan Chen, Weifang (CN); Cui Liu, Weifang (CN); Honglong Ma, Weifang (CN)

(73) Assignee: GOERTEK INC., Weifang (CN)

( * ) Notice: Subject to any disclaimer, the term of this patent is extended or adjusted under 35 U.S.C. 154(b) by 335 days.

(21) Appl. No.: 16/315,006

(22) PCT Filed: Jul. 20, 2017

(86) PCT No.: PCT/CN2017/093726
§ 371 (c)(1),
(2) Date: Jan. 3, 2019

(87) PCT Pub. No.: WO2018/032931
PCT Pub. Date: Feb. 22, 2018

(65) Prior Publication Data
US 2019/0347392 A1 Nov. 14, 2019

(30) Foreign Application Priority Data
Aug. 15, 2016 (CN) .......................... 201610674878.2

(51) Int. Cl.
*H04L 29/06* (2006.01)
*G06F 21/32* (2013.01)
(Continued)

(52) U.S. Cl.
CPC .......... *G06F 21/32* (2013.01); *G06F 21/6245* (2013.01); *H04L 67/306* (2013.01)

(58) Field of Classification Search
CPC ..... G06F 21/32; G06F 21/6245; H04L 67/306
See application file for complete search history.

(56) References Cited

U.S. PATENT DOCUMENTS

| 8,429,398 B2* | 4/2013 | Strandell | H04L 63/102 |
| | | | 713/155 |
| 2003/0076817 A1* | 4/2003 | Han | H04M 1/2535 |
| | | | 370/352 |

(Continued)

FOREIGN PATENT DOCUMENTS

| CN | 104123350 A | 10/2014 |
| CN | 104598795 A | 5/2015 |

(Continued)

OTHER PUBLICATIONS

Second Office Action issued in CN 201610674878.2.

*Primary Examiner* — Ghodrat Jamshidi
(74) *Attorney, Agent, or Firm* — Fox Rothschild LLP; Carol E. Thorstad-Forsyth

(57) ABSTRACT

A method and apparatus for person identification by a smart device, wherein the method comprises: establishing a registration information base that corresponds to the new user, and completing registration information base that corresponds to each valid user, and the registration information base comprises a name, a characteristic and person relation structure data, and the person relation structure data record each person relation appellation and respective person name; receiving an interaction command inputted by a current user, and collecting characteristic information of the current user; searching the registration information base of each valid user, judging whether a valid user that matches the characteristic information exists, and if yes, determining the user name of the current user; searching the registration information base that corresponds to the determined user name, and identifying a corresponding target person.

20 Claims, 3 Drawing Sheets

(51) Int. Cl.
  *G06F 21/62*  (2013.01)
  *H04L 29/08*  (2006.01)

(56) References Cited

U.S. PATENT DOCUMENTS

| | | | | |
|---|---|---|---|---|
| 2006/0059337 A1* | 3/2006 | Poyhonen | ........... | H04L 61/1511 |
| | | | | 713/165 |
| 2009/0006120 A1* | 1/2009 | Huang | .................... | G06Q 10/10 |
| | | | | 705/319 |
| 2011/0276396 A1* | 11/2011 | Rathod | ................ | H04L 51/066 |
| | | | | 705/14.49 |
| 2011/0321137 A1* | 12/2011 | Iida | ......................... | G06F 21/10 |
| | | | | 726/4 |
| 2015/0127628 A1* | 5/2015 | Rathod | ................ | G06F 16/955 |
| | | | | 707/710 |
| 2015/0161519 A1* | 6/2015 | Zhong | ................... | G06F 40/295 |
| | | | | 706/12 |
| 2016/0255173 A1* | 9/2016 | Hamano | ................ | H04W 4/02 |
| | | | | 709/203 |

FOREIGN PATENT DOCUMENTS

| | | |
|---|---|---|
| CN | 104615698 A | 5/2015 |
| CN | 104780514 A | 7/2015 |
| CN | 105425970 A | 3/2016 |
| CN | 105678129 A | 6/2016 |
| CN | 106294813 A | 1/2017 |

\* cited by examiner

METHOD AND APPARATUS FOR PERSON IDENTIFICATION BY A SMART DEVICE

CROSS REFERENCE TO RELATED APPLICATIONS

This application is a U.S. National Stage entry under 35 U.S.C. § 371 based on International Application No. PCT/CN2017/093726, filed on Jul. 20, 2017, which was published under PCT Article 21(2) and which claims priority to Chinese Patent Application No. 201610674878.2, filed on Aug. 15, 2016. The disclosure of the priority applications are hereby incorporated herein in their entirety by reference.

TECHNICAL FIELD

The present disclosure relates to the technical field of human-machine interaction, and particularly relates to a method and apparatus for person identification by a smart device.

BACKGROUND ART

Along with the development of artificial intelligence technique, increasingly more electronic devices have some personated settings. For new household consumer type electronic devices, usually one device may be registered with or personatedly know a plurality of users. However, in the prior art, the smart devices cannot understand the person relation between the registered users, and cannot intelligently identify the identity of the currently interacting user, which has poor user's experience.

SUMMARY

The present disclosure provides a method and apparatus for person identification by a smart device, to solve the problem of the prior art that smart devices cannot identify the identity of the currently interacting user and cannot understand the person relation between the registered users.

According to an aspect of the present disclosure, there is provided a method for person identification by a smart device, the method comprises:

establishing a registration information base that corresponds to a new user, and completing registration information bases that correspond to each valid users, according to a registration request inputted by the new user that contains identity information of the new user; wherein the identity information of the new user comprises a user name of the new user and person relation appellations of at least one valid user relative to the new user; and the registration information base comprises the user name, a user characteristic and person relation structure data centered on the corresponding user, and the person relation structure data record each person relation appellation and respective person name that has a corresponding person relation with the corresponding user;

receiving an interaction command inputted by a current user, and collecting characteristic information of the current user; wherein the interaction command comprises a name of a target person or relation appellation information of a target person;

searching the registration information base of each valid user, judging whether a valid user that matches the characteristic information exists, and if yes, determining the user name of the current user; and according to the name of the target person or the relation appellation information of the target person in the interaction command, searching the registration information base that corresponds to the determined user name, and identifying a corresponding target person.

According to another aspect of the present disclosure, there is provided an apparatus for person identification by a smart device, wherein the apparatus comprises:

an inputting unit, for receiving a registration request inputted by a new user that contains identity information of the new user, and sending the registration request of the new user to a registration information base unit; and, receiving an interaction command inputted by a current user, and collecting characteristic information of the current user and sending to an identifying unit, wherein the interaction command comprises a name of a target person or relation appellation information of a target person;

the registration information base unit, for, according to the registration request of the new user, establishing a registration information base that corresponds to the new user, and completing registration information bases that correspond to each valid users; wherein the identity information of the new user comprises a user name of the new user and person relation appellations of at least one valid user relative to the new user; and the registration information base comprises the user name, a user characteristic and person relation structure data centered on the corresponding user, and the person relation structure data record each person relation appellation and respective person name that has a corresponding person relation with the corresponding user; and the identifying unit, for searching the registration information base of each valid user, judging whether a valid user that matches the characteristic information exists, and if yes, determining the user name of the current user; and according to the name of the target person or the relation appellation information of the target person in the interaction command, searching the registration information base that corresponds to the determined user name, and identifying a corresponding target person.

The advantageous effects of the present disclosure are: the technical solutions of the embodiments of the present disclosure, establish a registration information base that corresponds to the new user, and complete registration information bases that correspond to each valid users, according to a registration request inputted by a new user that contains identity information of the new user; then, when receiving the interaction command inputted by the current user, collect characteristic information of the current user, search the registration information base of each valid user, judge whether a valid user that matches the characteristic information exists, and if yes, determine the user name of the current user, and complete the identity identification of the currently interacting user. Further, the technical solutions of the embodiments of the present disclosure may, according to the name of the target person or the relation appellation information of the target person mentioned in the interaction command of the current user, search the registration information base that corresponds to the identified current user name, and identify a corresponding target person, to complete the identification of the target person mentioned in the interactive instruction. Accordingly, the smart device cannot only identify the identity of the currently interacting user, but also can accurately identify the target person mentioned by the currently interacting user, which gives the smart device the ability to understand the person relation between the registered users, enables the smart device to be more intelligent and personated, and optimizes the user's experience.

DETAILED DESCRIPTION

The design concept of the present disclosure is: regarding the problem of the prior art, the present disclosure provides a solution of person identification by a smart device, which comprise by a registration request inputted by a new user that contains identity information of the new user, establishing a registration information base that corresponds to the new user, and completing registration information bases that correspond to each valid users; wherein the identity information of the new user comprises a user name of the new user and person relation appellations of at least one valid user relative to the new user; and the registration information base comprises the user name, a user characteristic and person relation structure data centered on the corresponding user, and the person relation structure data record each person relation appellation and respective person name that has a corresponding person relation with the corresponding user. Accordingly, when subsequently the interaction command of a certain interacting user is received, the present disclosure can judge whether the user is a valid user that has already successfully registered, and further, if it is a valid user, can, by the registration information base (for example, the person relation structure in the registration information base) corresponding to the valid user and the person name or person relation appellation mentioned in the interaction command, identify the corresponding target person, thereby improving the intelligence degree of the process of the interaction between the smart device and the user, and improving the competitive power of the smart device.

The First Embodiment

Figure 1:
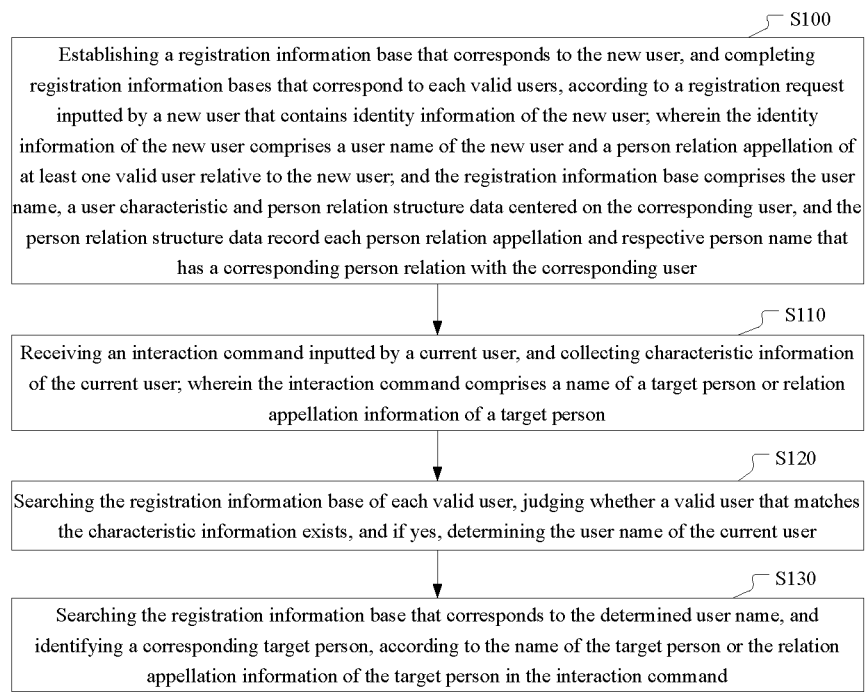
FIG. 1 is a schematic flow diagram of a method for person identification by a smart device according to an embodiment of the present disclosure.

FIG. 1 is a schematic flow diagram of a method for person identification by a smart device according to an embodiment of the present disclosure. Referring to FIG. 1, the method for person identification by a smart device of the present embodiment comprises:

Step S100, establishing a registration information base that corresponds to the new user, and completing registration information bases that correspond to each valid users, according to a registration request inputted by a new user that contains identity information of the new user; wherein the identity information of the new user comprises a user name of the new user and a person relation appellations of at least one valid user relative to the new user; and the registration information base comprises the user name, a user characteristic and person relation structure data centered on the corresponding user, and the person relation structure data record each person relation appellation and respective person name that has a corresponding person relation with the corresponding user;

Step S110, receiving an interaction command inputted by a current user, and collecting characteristic information of the current user; wherein the interaction command comprises a name of a target person or relation appellation information of a target person;

Step S120, searching the registration information base of each valid user, judging whether a valid user that matches the characteristic information exists, and if yes, determining the user name of the current user; and Step S130, searching the registration information base that corresponds to the determined user name, and identifying a corresponding target person, according to the name of the target person or the relation appellation information of the target person in the interaction command.

It can be known from the method shown in FIG. 1 that, in the present embodiment, by acquiring the person relation between the new user and a valid user, the method can incorporate the new user into the person relation network of the valid user, and in turn complete the establishing and identifying of the mutual person relation between other user in the person relation network of the valid user and the new user. Accordingly, when the smart device subsequently receives the interactive instruction of the user, the smart device can identify whether the currently interacting user is a valid user, and further, when the user is a valid user, can also according to the registration information base of the valid user and the person name or person relation appellation mentioned in the interactive instruction identify the corresponding target person, which gives the smart device personated person managing and understanding ability, and optimizes the user's experience.

The Second Embodiment

Figure 2:
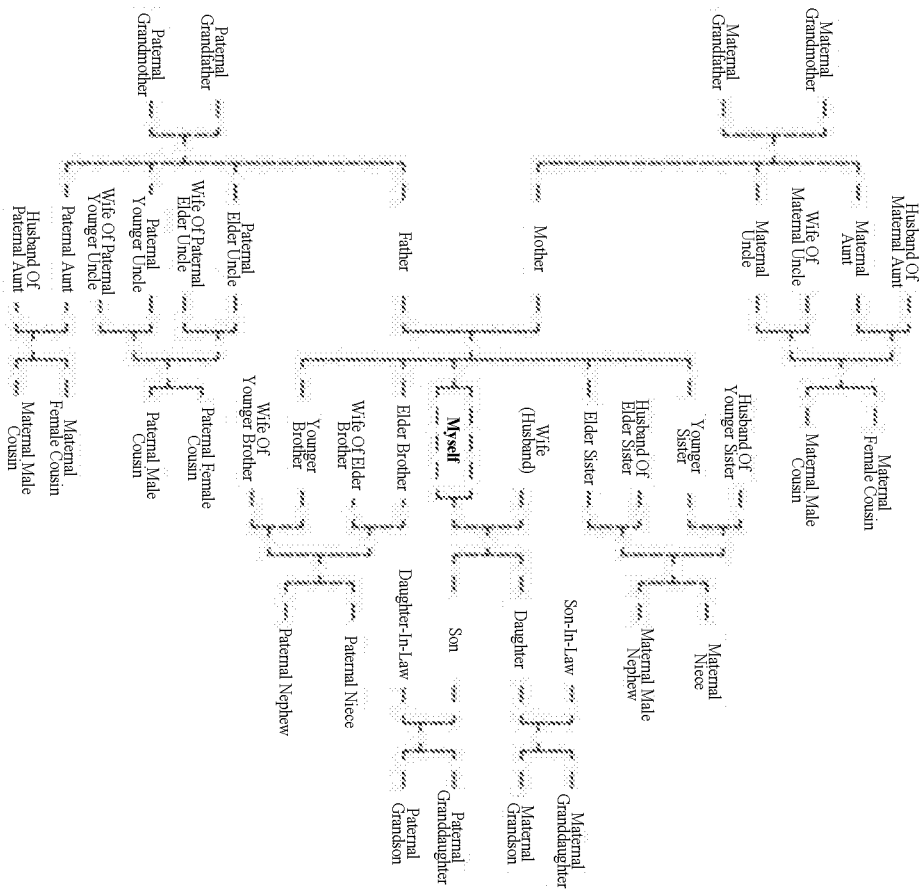
FIG. 2 is a schematic diagram of a person relation structure that is provided by an embodiment of the present disclosure.
Figure 3:
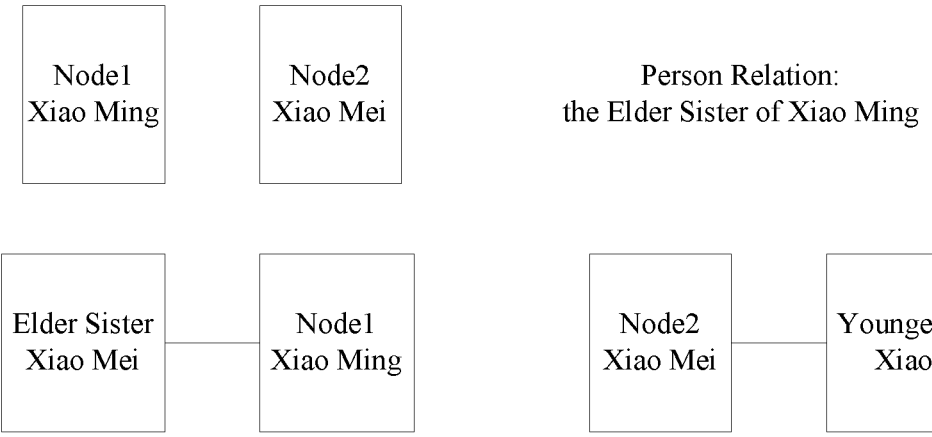
FIG. 3 is a schematic diagram of the identification of the method for person identification by a smart device according to an embodiment of the present disclosure.

FIG. 2 is a schematic diagram of the person relation structure that is provided by an embodiment of the present disclosure, and FIG. 3 is the schematic diagram of the identification of the method for person identification by a smart device according to an embodiment of the present disclosure. The process of implementing the method for person identification by a smart device according to the embodiments of the present disclosure is exemplarily described below by referring to FIGS. 2 and 3:

The smart device of the embodiments of the present disclosure, when implementing the person identification, firstly establishes person relation structures of the same structure for each registered user on the basis of the person relation that each user may probably have with other users in practical applications, as shown in FIG. 2. The person relation structure is a tree-like structure, wherein "myself" is the node that corresponds to a certain user, and then, with the node where the "myself" is located as the central node, each branch node records a person relation appellation that has a corresponding person relation with the central node, for example an elder sister branch node (that is, the branch node that corresponds to the elder sister of the certain user) and a younger sister branch node.

It can be understood that, FIG. 2 allocates the same person relation structure to each valid user, but in the implementation process, according to the different registration cases of the users, the branch nodes in the person relation structures that correspond to certain valid users may probably not record the corresponding person names. For example, when the person relation structure shown in FIG. 2 is the schematic diagram of the person relation structure of Zhang San, and if in practical applications, Zhang San does not have an elder brother, the branch node that corresponds to "elder brother" would not record the person name, and would merely record the person relation appellation as "elder brother". If Zhang San has an elder sister Zhang Yi, and the elder sister Zhang Yi has also registered to become a valid user, the position of the person relation appellation "elder sister" in the person relation structure of Zhang San would record the person name of the elder sister: Zhang Yi.

In the present embodiment, the establishing the registration information base corresponding to a new user for the new user and completing the registration information bases that correspond to each valid users comprises:

receiving a registration request inputted by the new user that contains at least name information of the new user, allocating a node to the new user according to the registration request, and establishing a person relation structure of the new user with the node as a central node, wherein each branch node in the person relation structure records a person relation appellation that has a corresponding person relation with the central node;

for example, allocating the node where the "myself" is located shown in FIG. 2 to the new user, and establishing the person relation structure of the new user; and judging whether a valid user is stored, and if yes, acquiring person relation appellation information of the valid user relative to the new user.

In practical applications, each successfully registered user becomes a valid user, each valid user corresponds to one registration information base, and the registration information base records the basic information of the user: the user name, the user characteristic and the person relation structure of the user. The user characteristic refers to for example a characteristic that uniquely identifies the user, such as the voice print characteristic of the user and the face characteristic of the user, and the function of user characteristic is for identifying the identity of currently interacting user.

After receiving the registration request of the new user and establishing a person relation structure for the new user, in order to complete the person identification, it is required to establish a relation with the correspondingly valid user stored in the smart device according to the person relation in reality of the new user. Therefore, the method of the present embodiment needs to firstly judge whether a valid user is stored. When the judgment result is that no valid user is stored, that is, the new user is the first registered user, that indicates that at this point the system has not stored other valid users yet, and therefore the method may merely allocate the corresponding person relation structure to the new user and end the flow.

When the judgment result is that a valid user is stored, it acquires person relation appellation information of the valid user relative to the new user. Exemplarily, the registration request sent by the new user in registering carries the person relation appellation information of a stored valid user relative to the new user, and then, after the smart device receives the registration request of the new user, the smart device, according to the person relation appellation information in the registration request, establishes the person relation between the new user and the valid user.

Exemplarily, to facilitate the new user to know and choose a valid user that has already been stored and therefore input the person relation appellation information of the valid user relative to the new user, the method may output the information of part of or all of the valid users to be chosen by the new user, and receive person relation appellation information of the chosen valid user relative to the new user, which is inputted by the new user.

The process of establishing the person relation is: adding the user name of the new user to a position of a corresponding person relation appellation in the person relation structure of the valid user, to complete the registration information base of the valid user, and adding the user name of the valid user to a position of a corresponding person relation appellation in the person relation structure of the new user, to obtain a corresponding registration information base of the new user, according to the acquired person relation appellation information of the valid user relative to the new user.

It should be noted that, in the present embodiment, the establishing of the person relation is a bidirectional process, that is, according to the person relation appellation information of a chosen valid user relative to the new user, which is inputted by the new user, adding and storing the user name of the new user to a position of a corresponding person relation appellation in the person relation structure of the chosen valid user, and, adding and storing the user name of the chosen valid user to a position of a corresponding person relation appellation in the person relation structure of the new user.

Further, in order to automatically complete the person relation between the registered users, and realize the automatic updating of the registration information bases of the valid users, after the adding the user name of the chosen valid user to a position of a corresponding person relation appellation in the person relation structure of the new user, the method further comprises judging in the person relation structure of the chosen valid user, whether the user name of remaining valid user is added to a position of a person relation appellation other than the name of the new user has been added, and if yes, according to pre-stored person relation deduction data, adding and storing user names of each valid users that have a person relation with the new user among the remaining valid users to a position of a corresponding person relation appellation in the person relation structure of the new user, and correspondingly, adding and storing the user name of the new user to a position of corresponding person relation appellation of person relation structure of each valid user that has a person relation with the new user among the remaining valid users.

Accordingly, when a new user is registered, the new user is merely required to input the person relation between the new user and a certain valid user, and the method of the embodiments of the present disclosure can, according to the person relation inputted by the new user between the new user and the certain valid user, the saved registration information base of each valid user, and person relational deduction data, conduct searching and deduction of person relation, thereby completing the automatic establishing of the person relation between the new user and each valid user that has a person relation with the new user, and further improving the intelligence degree of the smart device.

Referring to FIG. 3, FIG. 3 is a schematic diagram of establishing the person relation between the new user and a valid user. When being registered, each new user exists in the form of a central node of a person relation tree. Whenever a new user is added, as long as the new user adds the person relation with the central node of any of the saved person relation trees, the method of the present embodiment would automatically add the person relation of the new user with other valid users.

For example, the valid user that currently has already been saved is merely one, that is, Xiao Ming. The new user to be registered is Xiao Mei, and the person relation between Xiao Mei and Xiao Ming is: Xiao Mei is the elder sister of Xiao Ming.

The process of establishing the person relation between Xiao Mei and Xiao Ming is: the smart device receives the registration request inputted by Xiao Mei, wherein the registration request comprises: the user name of Xiao Mei, and the person relation appellation information of Xiao Mei relative to Xiao Ming (the elder sister of Xiao Ming), establishes a person relation tree for Xiao Mei (the structure of the person relation tree is as shown in FIG. 2), and allocates the central node (that is, the node 2 shown in FIG. 3) of the person relation tree to Xiao Mei; then, according to the person relation appellation information of Xiao Ming relative to Xiao Mei inputted by Xiao Mei, searches the person relation tree where Xiao Ming (that is, the node 1 shown in FIG. 3) is located (as shown in FIG. 2), finds the branch node that corresponds to the person relation appellation "elder sister", and then adds the name of Xiao Mei to the position of the person relation appellation "elder sister" in the person relation tree of Xiao Ming; and then, searches the person relation tree where Xiao Mei (that is, the node 2 shown in FIG. 3) is located (as shown in FIG. 2), finds the branch node that corresponds to the person relation appellation "younger brother", and then adds the name of Xiao Ming to the position of the person relation appellation that corresponds to the "younger brother" in the person relation tree of Xiao Mei.

Till now, the new user Xiao Mei has completed the establishing of the person relation with a valid user Xiao Ming, which in turn facilitates the subsequent establishing of the registration information base that corresponds to the new user Xiao Mei, and the completing of the registration information base that corresponds to the saved valid user Xiao Ming.

The Third Embodiment

Figure 4:
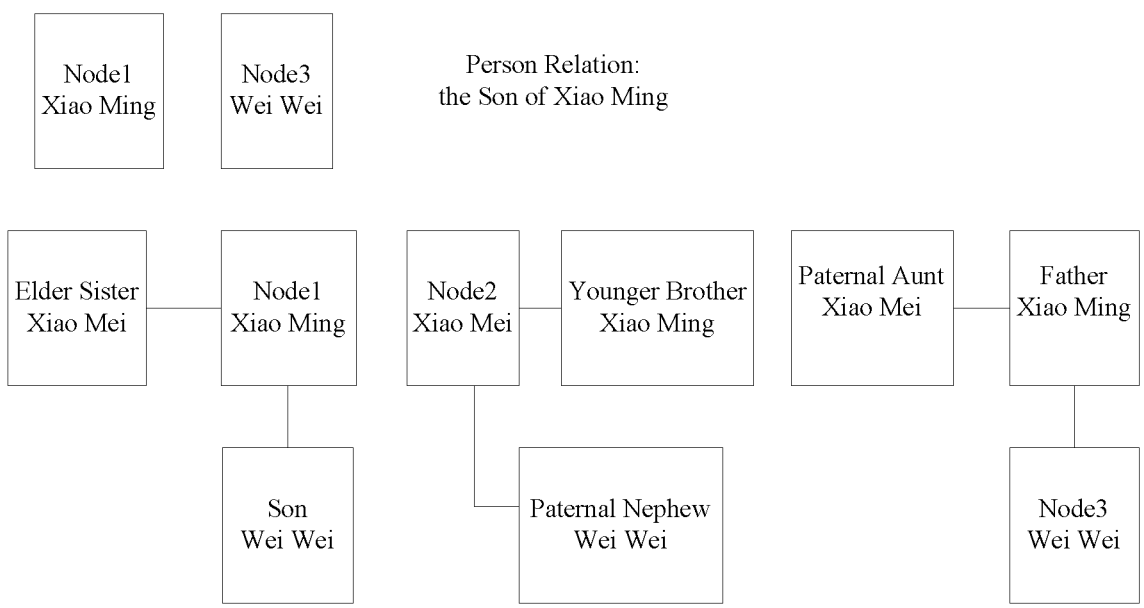
FIG. 4 is a schematic diagram of the identification of the method for person identification by a smart device according to another embodiment of the present disclosure.
Figure 5:
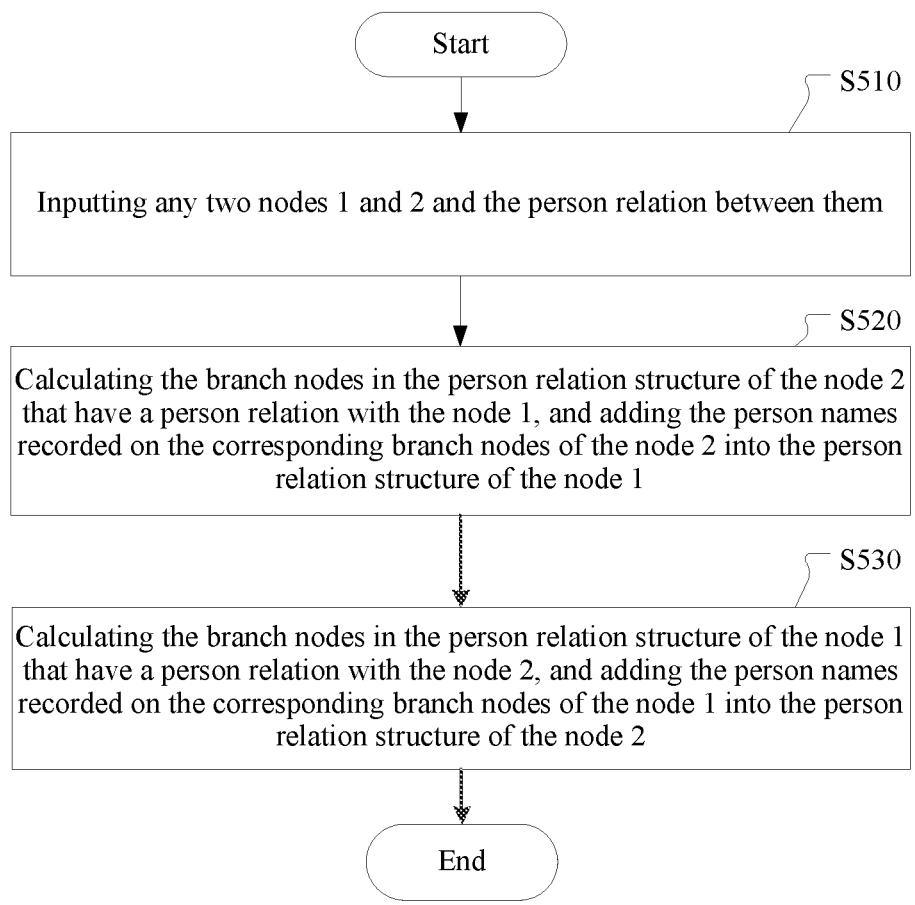
FIG. 5 is a principle diagram of the identification of the method for person identification by a smart device according to another embodiment of the present disclosure.

FIG. 2 is a schematic diagram of the person relation structure according to an embodiment of the present disclosure, FIG. 4 is a schematic diagram of the identification of the method for person identification by a smart device according to another embodiment of the present disclosure, and FIG. 5 is the principle diagram of the identification of the method for person identification by a smart device according to another embodiment of the present disclosure. The process of the identification between the new user and other saved users in the present embodiment is emphatically described below by referring to FIGS. 2, 4 and 5, and the other contents can be seen in the other embodiments of the present disclosure.

Following the above example, the system has already saved two valid users, which individually are: Xiao Mei corresponding to the node 2 and Xiao Ming corresponding to the node 1, and the person relation between Xiao Mei and Xiao Ming is elder sister and younger brother.

In the present embodiment, the present disclosure, after receiving the registration request of the third new user Wei Wei, establishes a person relation structure for the new user Wei Wei, and allocates the central node in the person relation structure to Wei Wei, that is, the node 3.

Based on the person relation appellation information of an alternative valid user relative to the new user, which is inputted by the registration request of the new user Wei Wei, the person relation between the new user Wei Wei and the chosen valid user is established.

Referring to FIG. 3, in the present embodiment, the new user Wei Wei inputs the person relation between Wei Wei and the node 1 Xiao Ming, that is, Wei Wei is the son of Xiao Ming.

The present disclosure, according to the person relation appellation information inputted by Wei Wei, searches the person relation tree of the node 1 Xiao Ming (as shown in FIG. 2), and adds the user name of Wei Wei to the position of the person relation appellation "son".

Then, the present disclosure judges whether the branch node of the node 1 Xiao Ming records the person names of remaining valid users, finds that a branch node (the node that corresponds to the position of the appellation elder sister) of the person relation tree of Xiao Ming records the name of the valid user Xiao Mei, and then, according to the information and the person relational deduction data, deduces that the person relation between Wei Wei and Xiao Mei is paternal aunt and paternal nephew relation; and by the person relation that is obtained by deduction, adds the name of Wei Wei to the position of the person relation appellation "paternal nephew" in the person relation tree where the node 2 Xiao Mei is located, and adds the name of Xiao Mei to the position of the person relation appellation "paternal aunt" in the person relation tree where the node 3 Wei Wei is located.

The person relation deduction data herein may be a person relation deduction table, and the person relation deduction table records person relation between person relation appellations of any two nodes in the person relation structure.

For example, Wei Wei, the son of Xiao Mei's younger brother, is a paternal nephew of Xiao Mei, and Xiao Mei is a paternal aunt of Wei Wei, which is a fixed relation. Therefore, the person relation table may record: the appellation 1 "son", the appellation 2 "elder sister", and that the person relation between the two appellations is paternal aunt and paternal nephew relation. It can be known from FIG. 2 that, the total number of the person relation appellations of five generations is 44, so the data volume to be stored is $C_{44}^2$.

Accordingly, the new user Wei Wei is merely required to input the person relation with one valid user (Xiao Ming), and then the method of the present embodiment can, according to the person relation structure in the registration information base of each valid user and the saved person relation deduction data, deduce the person relation between the new user Wei Wei and the remaining valid users (such as Xiao Mei), and complete the person relation structures that individually correspond to Wei Wei and Xiao Mei.

It should be noted that, the present embodiment makes the illustrative description by taking the example that the new user only inputs the person relation with the valid user Xiao Ming corresponding to the node 1, but in the other embodiments of the present disclosure, the new user may only input the person relation with the valid user Xiao Mei corresponding to the node 2, which is not limited.

FIG. 5 is a flow chart of the principle of the identification of the method for person identification by a smart device according to another embodiment of the present disclosure. As shown in FIG. 5, when the method is exemplarily implemented, the method may complete the person relation structure of two corresponding nodes by providing an automatic supplementation algorithm, and calculating through the automatic supplementation algorithm.

Referring to FIG. 5, the flow of the automatic supplementation algorithm starts, executing Step S510, by inputting any two nodes 1 and 2 and the person relation between them.

For example, inputting that the node 1 is Xiao Ming, the node 2 is Xiao Mei, and the person relation between them: the elder sister of Xiao Ming. Proceeding to Step S520.

Step S520, calculating the branch nodes in the person relation structure of the node 2 that have a person relation with the node 1, and adding the person names that are recorded on the corresponding branch nodes of the node 2 into the person relation structure of the node 1. Then Proceeding to Step S530.

For example, in the person relation structure where the node 2 Xiao Mei is located, a branch node of the appellation son further records the name of Xiao Wu, so according to that information, the person name Xiao Wu is added to the position of the person relation appellation "maternal nephew" in the person relation structure where the node 1 Xiao Ming is located. In addition, the method may also correspondingly add the person name of Xiao Ming into the node that corresponds to the person relation appellation "maternal uncle" in the person relation structure where Xiao Wu is located.

Step S530, calculating the branch nodes in the person relation structure of the node 1 that have a person relation with the node 2, and adding the person names that are recorded on the corresponding branch nodes of the node 1 into the person relation structure of the node 2.

In this step, the method calculates whether the person relation structure where the node 1 Xiao Ming is located records the person name of a valid user, and, if the name of the valid user is recorded, whether the person name has a person relation with the node 2 Xiao Mei. For example, the person relation structure of the node 1 Xiao Ming has merely one branch node whose person relation appellation is "colleague", and the branch node records the name of a valid user Zhang San; that is, the user Zhang San and Xiao Ming are of the relation of colleague. At this point, according to the method of the embodiment of the present disclosure, the method can determine that the person relation structure of the node 1 does not contain a branch node that has a person relation with the node 2, and then the person relation structure that corresponds to the node 2 would not be added the flow would be ended directly.

It should be noted that, in the present embodiment, the order of executing Step S520 and Step S530 is not strictly limited. That is, the method may execute Step S520 firstly and then execute Step S530, or execute Step S530 firstly and then execute Step S520, or simultaneously execute Step S520 and Step S530.

The Fourth Embodiment

The present embodiment emphatically explains the application of the method for person identification by a smart device, and the other contents can be seen in the other embodiments of the present disclosure.

On the basis of the second embodiment or the third embodiment, after the user has been registered on the smart device, the method of the present embodiment can identify the identity of the currently interacting user; for example, the method can determine the identity of the speaker. If the interaction command sent by the currently interacting user contains task information, the method may, after identifying the corresponding target person, control the smart device to execute a task that is instructed by the task information, and output execution result information to the current user.

The First Application Scene

For example, the valid user Xiao Mei may directly speak to the smart device "send this to my paternal nephew".

The smart device, after receiving the interactive instruction, firstly identifies that the current user is the valid user Xiao Mei.

A exemplary approach of identifying the current user may be: collecting voice print characteristic information or face image characteristic information of the current user, matching the collected voice print characteristic information or face image characteristic information with the user characteristics in the registration information base of each valid user, and if the voice print characteristic information or face image characteristic information of the current user matches a user characteristic in the registration information base of a certain valid user, determining that the user name of the valid user is the user name of the current user. In the other embodiments of the present disclosure, the method may also employ techniques other than voice print identification and face identification to complete the identification of the identity of the current user, which is not limited.

The smart device, after identifying that the current user is the valid user Xiao Mei, who has already successfully registered, searches the person relation structure of Xiao Mei according to the person relation appellation "paternal nephew" mentioned in the interactive instruction sent by Xiao Mei, finds the name of Wei Wei at the position of the person relation appellation "paternal nephew" in the person relation structure of Xiao Mei, and then identifies the target person as Wei Wei.

After identifying the target person as Wei Wei, the smart device may execute the task sent by the currently interacting user. However, the operation of the smart device exemplarily executing the task is not a key of the present embodiment, and may employ any available technical means in the prior art, which is not limited.

In addition, when several suitable target persons are found, the procedure may be treated according to the actual condition. For example, the method may set priorities on the node that corresponds to each person appellation. If a plurality of person relation appellations "paternal nephew" are found currently, and different person names are recorded at the positions of those same person relation appellations respectively, the method may, according to the priorities preset at the positions of the person relation appellations, choose the person name at the position of the person relation appellation of the high priority as the target person.

The Second Application Scene

In the present embodiment, the smart device may be a smart robot. The smart robot is registered with three valid users, which individually are: valid user 1: Wei Wei, valid user 2: Xiao Ming (the father of Wei Wei) and valid user 3: Lao Wang (the father of Xiao Ming).

When Wei Wei is playing with the robot in the living room, he may directly speak to the robot, "show me the photo of my paternal grandfather", and the robot identifies that the currently interacting user is Wei Wei, and intelligently understands that the target person indicated by the person relation appellation "paternal grandfather" is Lao Wang. Accordingly, the method gives the robot the ability to understand the person relation between the registered users, which optimizes the user's experience.

The Fifth Embodiment

Figure 6:
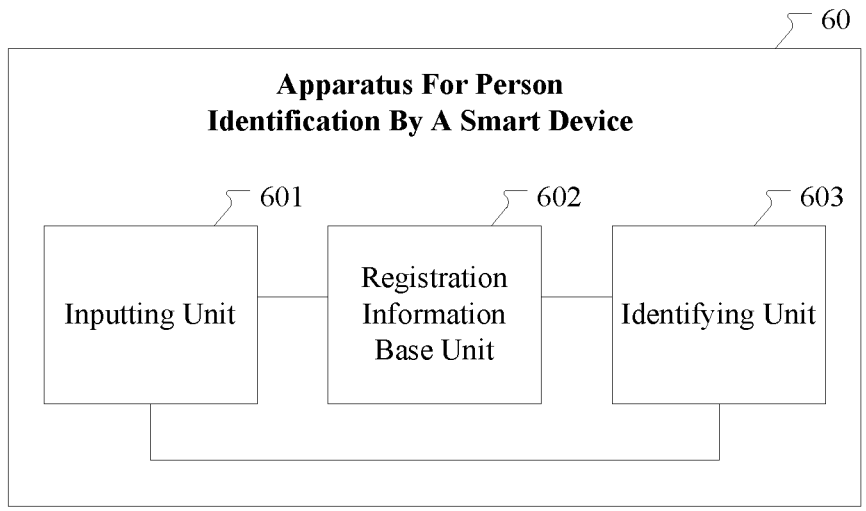
FIG. 6 is a structural block diagram of an apparatus for person identification by a smart device according to another embodiment of the present disclosure.

FIG. 6 is a structural block diagram of an apparatus for person identification by a smart device that is provided by another embodiment of the present disclosure. Referring to FIG. 6, the apparatus 60 for person identification by a smart device of the present embodiment comprises:

an inputting unit 601, for receiving a registration request inputted by a new user that contains identity information of the new user, and sending the registration request of the new user to a registration information base unit 602; and, receiving an interaction command inputted by a current user, and collecting characteristic information of the current user and sending to an identifying unit 603, wherein the interaction command comprises a name of a target person or relation appellation information of a target person;

the registration information base unit 602, for, according to the registration request of the new user, establishing a registration information base that corresponds to the new user, and completing registration information bases that correspond to each valid users; wherein the identity information of the new user comprises a user name of the new user and person relation appellation of at least one valid user relative to the new user; and the registration information base comprises the user name, a user characteristic and person relation structure data centered on the corresponding user, and the person relation structure data record each person relation appellation and respective person name that has a corresponding person relation with the corresponding user; and the identifying unit 603, for searching the registration information base of each valid user, judging whether a valid user that matches the characteristic information exists, and if yes, determining the user name of the current user; and according to the name of the target person or the relation appellation information of the target person in the interaction command, searching the registration information base that corresponds to the determined user name, and identifying a corresponding target person.

In an embodiment of the present disclosure, the inputting unit 601 is for receiving a registration request inputted by the new user that contains at least name information of the new user, and sending the registration request to the registration information base unit 602; and the registration information base unit 602 is for allocating a node to the new user according to the registration request, and establishing a person relation structure of the new user with the node as a central node, wherein each branch node in the person relation structure records a person relation appellation that has a corresponding person relation with the central node; judging whether a valid user is stored, and if yes, acquiring person relation appellation information of the valid user relative to the new user; and adding the user name of the new user to a position of a corresponding person relation appellation in the person relation structure of the valid user, to complete the registration information base of the valid user, and adding the user name of the valid user to a position of a corresponding person relation appellation in the person relation structure of the new user, to obtain a corresponding registration information base of the new user, according to the acquired person relation appellation information of the valid user relative to the new user.

In an embodiment of the present disclosure, the apparatus 60 further comprises: an outputting unit, for outputting information of part of or all of the valid users to be chosen by the new user;

the inputting unit 601 is further for receiving person relation appellation information of a chosen valid user relative to the new user, which is inputted by the new user, and sending the person relation appellation information of the chosen valid user relative to the new user to the registration information base unit 602; and the registration information base unit 602 is for, according to the person relation appellation information of the chosen valid user relative to the new user, which is inputted by the new user and sent from the inputting unit, adding and storing the user name of the new user to a position of a corresponding person relation appellation in the person relation structure of the chosen valid user, and, adding and storing the user name of the chosen valid user to a position of a corresponding person relation appellation in the person relation structure of the new user.

In an embodiment of the present disclosure, the registration information base unit 602 is further for, after the adding the user name of the chosen valid user to a position of a corresponding person relation appellation in the person relation structure of the new user, judging in the person relation structure of the chosen valid user, whether a user name of a remaining valid user is added to a position of a person relation appellation other than the name of the new user has been added, and if yes, according to pre-stored person relation deduction data, adding and storing user names of each valid users that have a person relation with the new user among the remaining valid users to a position of corresponding person relation appellation in the person relation structure of the new user, and correspondingly, adding and storing the user name of the new user to a position of corresponding person relation appellation in the person relation structure of each valid user that has a person relation with the new user among the remaining valid users.

In an embodiment of the present disclosure, the person relation deduction data are a person relation deduction table, and the person relation deduction table records person relation between person relation appellations of any two nodes in the person relation structure.

In an embodiment of the present disclosure, the interaction command inputted by the current user and received by the inputting unit 601 further comprises task information; and the apparatus further comprises: a task controlling unit, for, after the identifying unit 603 identifies a corresponding target person, controlling the smart device to execute a task that is instructed by the task information; and the outputting unit is further for outputting execution result information to the current user.

In an embodiment of the present disclosure, the identifying unit 603 is for collecting voice print characteristic information or face image characteristic information of the current user, matching the collected voice print characteristic information or face image characteristic information with the user characteristics in the registration information base of each valid user, and if the voice print characteristic information or face image characteristic information of the current user matches a user characteristic in the registration information base of a certain valid user, determining that the user name of the valid user is the user name of the current user.

Correspondingly to the above method for person identification by a smart device, the present application further provides an apparatus for person identification by a smart device, wherein the apparatus comprises a processor and a machine-readable storage medium, the machine-readable storage medium stores a machine executable instruction that is executable by the processor, and the processor executes the machine executable instruction to implement the steps of the above method for person identification by a smart device.

It should be noted that, the apparatus for person identification by a smart device in the present embodiment is corresponding to the above method for person identification by a smart device, so the parts that are not described of the implementing steps of the apparatus for person identification by a smart device of the present embodiment can be seen in the relative description of the preceding embodiment of the present disclosure, and are not further described here.

In conclusion, the technical solutions of the embodiments of the present disclosure, establish a registration information base that corresponds to the new user, and complete registration information bases that correspond to each valid users, according to a registration request inputted by a new user that contains identity information of the new user; then, when receiving the interaction command inputted by the current user, collect characteristic information of the current user, search the registration information base of each valid user, judge whether a valid user that matches the characteristic information exists, and if yes, determine the user name of the current user, and complete the identification of the currently interacting user. Further, the technical solutions of the embodiments of the present disclosure may, according to the name of the target person or the relation appellation information of the target person mentioned in the interaction command of the current user, search the registration information base that corresponds to the identified current user name, and identify a corresponding target person, to complete the identification of the target person mentioned in the interactive instruction. Accordingly, the smart device can not only identify the identity of the currently interacting user, but also can accurately identify the target person mentioned by the current user, which gives the smart device the ability to understand the person relation between the registered users, improves the intelligence level of the smart device, and optimizes the user's experience.

The above are only exemplary embodiments of the present disclosure. By the teaching of the present disclosure, a person skilled in the art can make other modifications or variations on the basis of the above embodiments. A person skilled in the art should appreciate that, the above special descriptions are only for the purpose of better explaining the present disclosure, and the protection scope of the present disclosure should be subject to the protection scope of the claims.

What is claimed is:

1. A method for person identification by a smart device, wherein the method comprises:
    establishing a registration information base that corresponds to a new user, and completing registration information bases that correspond to each valid users, according to a registration request inputted by the new user that contains identity information of the new user; wherein the identity information of the new user comprises a user name of the new user and person relation appellations of at least one valid user relative to the new user; and the registration information base comprises the user name, a user characteristic and person relation structure data centered on a corresponding user, and the person relation structure data record each person relation appellation and respective person name that has a corresponding person relation with the corresponding user;
    receiving an interaction command inputted by a current user, and collecting characteristic information of the current user; wherein the interaction command comprises a name of a target person or relation appellation information of the target person;
    searching the registration information base of each valid user, judging whether a valid user that matches the characteristic information exists, and if yes, determining a user name of the current user; and
    searching the registration information base that corresponds to the determined user name, and identifying a corresponding target person, according to the name of the target person or the relation appellation information of the target person in the interaction command.

2. The method according to claim 1, wherein the establishing a registration information base that corresponds to a new user, and completing registration information bases that correspond to each valid users, according to a registration request inputted by the new user that contains identity information of the new user, comprises:
    receiving a registration request inputted by the new user that contains at least name information of the new user, allocating a node to the new user according to the registration request, and establishing a person relation structure of the new user with the node as a central node, wherein each branch node in the person relation structure records a person relation appellation that has a corresponding person relation with the central node;
    judging whether a valid user is stored, and if yes, acquiring person relation appellation information of the valid user relative to the new user; and
    adding the user name of the new user to a position of a corresponding person relation appellation in the person relation structure of the valid user, to complete the registration information base of the valid user, and adding the user name of the valid user to a position of a corresponding person relation appellation in the person relation structure of the new user, to obtain a corresponding registration information base of the new user, according to the acquired person relation appellation information of the valid user relative to the new user.

3. The method according to claim 2, wherein the method further comprises:
    outputting information of part of or all of the valid users to be chosen by the new user;
    the step of acquiring person relation appellation information of the valid user relative to the new user comprises:
    receiving person relation appellation information of a chosen valid user relative to the new user that is inputted by the new user; and
    the step of adding the user name of the new user to a position of a corresponding person relation appellation in the person relation structure of the valid user, to complete the registration information base of the valid user, and adding the user name of the valid user to a position of a corresponding person relation appellation in the person relation structure of the new user, to obtain a corresponding registration information base of the new user, according to the acquired person relation appellation information of the valid user relative to the new user, comprises:
        adding and storing the user name of the new user to the position of the corresponding person relation appellation in the person relation structure of the chosen valid user, and, adding and storing the user name of the chosen valid user to the position of the corresponding person relation appellation in the person relation structure of the new user, according to the person relation appellation information of a chosen valid user relative to the new user that is inputted by the new user.

4. The method according to claim 3, wherein the step of adding the user name of the new user to a position of a corresponding person relation appellation in the person relation structure of the valid user, to complete the registration information base of the valid user, and adding the user name of the valid user to a position of a corresponding person relation appellation in the person relation structure of the new user, to obtain a corresponding registration information base of the new user, according to the acquired person relation appellation information of the valid user relative to the new user, further comprises:

after the adding the user name of the chosen valid user to the position of the corresponding person relation appellation in the person relation structure of the new user, judging in the person relation structure of the chosen valid user, whether a user name of a remaining valid user is added to the position of the person relation appellation other than the position to which the name of the new user has been added, and if yes, according to prestored person relation deduction data, adding and storing user names of each valid users that have a person relation with the new user among the remaining valid users to the position of the corresponding person relation appellation in the person relation structure of the new user, and correspondingly, adding and storing the user name of the new user to the position of the corresponding person relation appellation of person relation structure of each valid user that has a person relation with the new user among the remaining valid users.

5. The method according to claim 4, wherein the person relation deduction data are a person relation deduction table, and the person relation deduction table records person relation between person relation appellations of any two nodes in the person relation structure.

6. The method according to claim 1, wherein the interaction command inputted by the current user further comprises task information, and after identifying a corresponding target person, the method further comprises: controlling the smart device to execute a task that is instructed by the task information, and outputting execution result information to the current user.

7. The method according to claim 1, wherein the step of collecting characteristic information of the current user comprises:

collecting voice print characteristic information or face image characteristic information of the current user;

the step of searching the registration information base of each valid user, and judging whether a valid user that matches the characteristic information exists comprises:

matching the collected voice print characteristic information or face image characteristic information with the user characteristics in the registration information base of each valid user, and if the voice print characteristic information or face image characteristic information of the current user matches a user characteristic in the registration information base of a certain valid user, determining that the user name of the valid user is the user name of the current user.

8. An apparatus for person identification by a smart device, wherein the apparatus comprises:

an inputting circuit configured to receive a registration request inputted by a new user that contains identity information of the new user, and send the registration request of the new user to a registration information base circuit; and, receive an interaction command inputted by a current user, and collect characteristic information of the current user and send to an identifying circuit, wherein the interaction command comprises a name of a target person or relation appellation information of a target person;

the registration information base circuit configured to establish a registration information base that corresponds to the new user, and complete registration information bases that correspond to each valid users, according to the registration request of the new user; wherein the identity information of the new user comprises a user name of the new user and person relation appellations of at least one valid user relative to the new user; and the registration information base comprises the user name, a user characteristic and person relation structure data centered on the corresponding user, and the person relation structure data record each person relation appellation and respective person name that has a corresponding person relation with the corresponding user; and the identifying circuit configured to search the registration information base of each valid user, judge whether a valid user that matches the characteristic information exists, and if yes, determine the user name of the current user; and search the registration information base that corresponds to the determined user name, and identify a corresponding target person, according to the name of the target person or the relation appellation information of the target person in the interaction command.

9. The apparatus according to claim 8, wherein the inputting circuit is further configured to receive a registration request inputted by the new user that contains at least name information of the new user, and send the registration request to the registration information base circuit; and the registration information base circuit further configured to:

allocate a node to the new user according to the registration request, and establish a person relation structure of the new user with the node as a central node, wherein each branch node in the person relation structure records a person relation appellation that has a corresponding person relation with the central node; and judge whether a valid user is stored, and if yes, acquire person relation appellation information of the valid user relative to the new user; and add the user name of the new user to a position of a corresponding person relation appellation in the person relation structure of the valid user, to complete the registration information base of the valid user, and add the user name of the valid user to a position of a corresponding person relation appellation in the person relation structure of the new user, to obtain a corresponding registration information base of the new user, according to the acquired person relation appellation information of the valid user relative to the new user.

10. The apparatus according to claim 9, wherein the apparatus further comprises:

an outputting circuit configured to output information of part of or all of the valid users to be chosen by the new user;

wherein the inputting circuit is further configured to receive person relation appellation information of a chosen valid user relative to the new user that is inputted by the new user, and send the person relation appellation information of the chosen valid user relative to the new user to the registration information base circuit; and wherein the registration information base circuit is further configured to, add and store the user name of the new user to the position of the corresponding person relation appellation in the person relation structure of the chosen valid user, and, add and store the user name of the chosen valid user to the position of the corresponding person relation appellation in the person relation structure of the new user, according to the person relation appellation information of the chosen valid user relative to the new user that is inputted by the new user and sent from the inputting circuit.

11. The apparatus according to claim 10, wherein the registration information base circuit is further configured to, after the adding the user name of the chosen valid user to the position of the corresponding person relation appellation in the person relation structure of the new user, judge in the person relation structure of the chosen valid user, whether a user name of a remaining valid user is added to the position of the person relation appellation other than the position to which the name of the new user has been added, and if yes, according to prestored person relation deduction data, add and store user names of each valid users that have a person relation with the new user among the remaining valid users to the position of the corresponding person relation appellation in the person relation structure of the new user, and correspondingly, add and store the user name of the new user to the position of the corresponding person relation appellation of person relation structure of each valid user that has a person relation with the new user among the remaining valid users.

12. The apparatus according to claim 11, wherein the person relation deduction data are a person relation deduction table, and the person relation deduction table records person relation between person relation appellations of any two nodes in the person relation structure.

13. The apparatus according to claim 8, wherein:
the interaction command inputted by the current user further comprises task information;
the apparatus further comprises: a task controlling circuit, for, after the identifying circuit identifies a corresponding target person, controlling the smart device to execute a task that is instructed by the task information; and
the outputting circuit is further configured to output execution result information to the current user.

14. The apparatus according to claim 8, wherein the inputting circuit is configured to collect voice print characteristic information or face image characteristic information of the current user; and
the identifying circuit is further configured to match the collected voice print characteristic information or face image characteristic information with the user characteristics in the registration information base of each valid user, and if the voice print characteristic information or face image characteristic information of the current user matches a user characteristic in the registration information base of a certain valid user, determining that the user name of the valid user is the user name of the current user.

15. An apparatus for person identification by a smart device, wherein the apparatus comprises a processor and a non-transitory machine-readable storage medium, the non-transitory machine-readable storage medium stores a machine executable instruction that is executable by the processor, and the processor executes the machine executable instruction to implement the following steps:

establishing a registration information base that corresponds to a new user, and completing registration information bases that correspond to each valid users, according to a registration request inputted by the new user that contains identity information of the new user; wherein the identity information of the new user comprises a user name of the new user and person relation appellations of at least one valid user relative to the new user; and the registration information base comprises the user name, a user characteristic and person relation structure data centered on a corresponding user, and the person relation structure data record each person relation appellation and respective person name that has a corresponding person relation with the corresponding user;

receiving an interaction command inputted by a current user, and collecting characteristic information of the current user; wherein the interaction command comprises a name of a target person or relation appellation information of the target person;

searching the registration information base of each valid user, judging whether a valid user that matches the characteristic information exists, and if yes, determining a user name of the current user; and searching the registration information base that corresponds to the determined user name, and identifying a corresponding target person, according to the name of the target person or the relation appellation information of the target person in the interaction command.

16. The apparatus according to claim 15, wherein the establishing a registration information base that corresponds to a new user, and completing registration information bases that correspond to each valid users, according to a registration request inputted by the new user that contains identity information of the new user, comprises:

receiving a registration request inputted by the new user that contains at least name information of the new user, allocating a node to the new user according to the registration request, and establishing a person relation structure of the new user with the node as a central node, wherein each branch node in the person relation structure records a person relation appellation that has a corresponding person relation with the central node;

judging whether a valid user is stored, and if yes, acquiring person relation appellation information of the valid user relative to the new user; and adding the user name of the new user to a position of a corresponding person relation appellation in the person relation structure of the valid user, to complete the registration information base of the valid user, and adding the user name of the valid user to a position of a corresponding person relation appellation in the person relation structure of the new user, to obtain a corresponding registration information base of the new user, according to the acquired person relation appellation information of the valid user relative to the new user.

17. The apparatus according to claim 16, wherein the processor executes the machine executable instruction further to implement the step: outputting information of part of or all of the valid users to be chosen by the new user;

the step of acquiring person relation appellation information of the valid user relative to the new user comprises:

receiving person relation appellation information of a chosen valid user relative to the new user that is inputted by the new user; and the step of adding the user name of the new user to a position of a corresponding person relation appellation in the person relation structure of the valid user, to complete the registration information base of the valid user, and adding the user name of the valid user to a position of a corresponding person relation appellation in the person relation structure of the new user, to obtain a corresponding registration information base of the new user, according to the acquired person relation appellation information of the valid user relative to the new user, comprises:

adding and storing the user name of the new user to the position of the corresponding person relation appellation in the person relation structure of the chosen valid user, and, adding and storing the user name of the chosen valid user to the position of the corresponding person relation appellation in the person relation structure of the new user, according to the person relation appellation information of a chosen valid user relative to the new user that is inputted by the new user.

18. The apparatus according to claim 17, wherein the step of adding the user name of the new user to a position of a corresponding person relation appellation in the person relation structure of the valid user, to complete the registration information base of the valid user, and adding the user name of the valid user to a position of a corresponding person relation appellation in the person relation structure of the new user, to obtain a corresponding registration information base of the new user, according to the acquired person relation appellation information of the valid user relative to the new user, further comprises:

after the adding the user name of the chosen valid user to the position of the corresponding person relation appellation in the person relation structure of the new user, judging in the person relation structure of the chosen valid user, whether a user name of a remaining valid user is added to the position of the person relation appellation other than the position to which the name of the new user has been added, and if yes, according to prestored person relation deduction data, adding and storing user names of each valid users that have a person relation with the new user among the remaining valid users to the position of the corresponding person relation appellation in the person relation structure of the new user, and correspondingly, adding and storing the user name of the new user to the position of the corresponding person relation appellation of person relation structure of each valid user that has a person relation with the new user among the remaining valid users;

wherein the person relation deduction data are a person relation deduction table, and the person relation deduction table records person relation between person relation appellations of any two nodes in the person relation structure.

19. The apparatus according to claim 15, wherein the interaction command inputted by the current user further comprises task information, and after identifying a corresponding target person, the processor executes the machine executable instruction further to implement step: controlling the smart device to execute a task that is instructed by the task information, and outputting execution result information to the current user.

20. The apparatus according to claim 15, wherein the step of collecting characteristic information of the current user comprises:

collecting voice print characteristic information or face image characteristic information of the current user;

the step of searching the registration information base of each valid user, and judging whether a valid user that matches the characteristic information exists comprises:

matching the collected voice print characteristic information or face image characteristic information with the user characteristics in the registration information base of each valid user, and if the voice print characteristic information or face image characteristic information of the current user matches a user characteristic in the registration information base of a certain valid user, determining that the user name of the valid user is the user name of the current user.

* * * * *